US010417442B2

(12) United States Patent
Ohara et al.

(10) Patent No.: US 10,417,442 B2
(45) Date of Patent: Sep. 17, 2019

(54) SERVER DEVICE, DATA SEARCH SYSTEM, SEARCH METHOD, AND RECORDING MEDIUM FOR EXTRACTING CONCEALED DATA

(71) Applicant: NEC Corporation, Tokyo (JP)

(72) Inventors: Kazuma Ohara, Tokyo (JP); Toshinori Araki, Tokyo (JP); Jun Furukawa, Tokyo (JP)

(73) Assignee: NEC CORPORATION, Tokyo (JP)

(*) Notice: Subject to any disclaimer, the term of this patent is extended or adjusted under 35 U.S.C. 154(b) by 84 days.

(21) Appl. No.: 15/549,580

(22) PCT Filed: Feb. 5, 2016

(86) PCT No.: PCT/JP2016/000595
§ 371 (c)(1),
(2) Date: Aug. 8, 2017

(87) PCT Pub. No.: WO2016/129259
PCT Pub. Date: Aug. 18, 2016

(65) Prior Publication Data
US 2018/0039792 A1 Feb. 8, 2018

(30) Foreign Application Priority Data

Feb. 9, 2015 (JP) ................................. 2015-022891

(51) Int. Cl.
*G06F 21/62* (2013.01)
*G06F 16/248* (2019.01)
(Continued)

(52) U.S. Cl.
CPC .......... *G06F 21/6227* (2013.01); *G06F 16/00* (2019.01); *G06F 16/248* (2019.01);
(Continued)

(58) Field of Classification Search
CPC ..................................................... G06F 21/602
See application file for complete search history.

(56) References Cited

U.S. PATENT DOCUMENTS 8,930,691 B2 * 1/2015 Kamara ............... G06F 21/6218
713/165
9,177,058 B2 * 11/2015 Camelo ................... G06F 16/95
(Continued)

FOREIGN PATENT DOCUMENTS

JP      2004-336702      11/2004
JP      2011-199821      10/2011

OTHER PUBLICATIONS

International Search Report, PCT/JP2016/000595, dated Apr. 19, 2016.
(Continued)

*Primary Examiner* — Ali Shayanfar
(74) *Attorney, Agent, or Firm* — Young & Thompson

(57) ABSTRACT

In order to provide a server device and the like that are capable of quickly extracting data without need for a client that performs a query of search processing to have a secret key. A server device includes: data storage unit that stores concealed registration data including distribution information of registration data distributed by secret sharing scheme and a ciphertext of the registration data encrypted by searchable encryption; token calculation unit that generates a token for data search of the searchable encryption by communicating with an external server device and performs secret computation by using a search query and the distribution information; and data search unit that performs data search from the token for data search received from the token calculation unit and the concealed registration data acquired from the data storage unit, and outputs a search result.

7 Claims, 12 Drawing Sheets

(51) Int. Cl.
    *G06F 16/2455* (2019.01)
    *H04L 9/06* (2006.01)
    *H04L 29/06* (2006.01)
    *G06F 21/60* (2013.01)
    *H04L 9/08* (2006.01)
    *G06F 16/00* (2019.01)
    *G06F 16/33* (2019.01)

(52) U.S. Cl.
    CPC ...... *G06F 16/2455* (2019.01); *G06F 16/3331* (2019.01); *G06F 21/602* (2013.01); *G06F 21/6245* (2013.01); *H04L 9/0618* (2013.01); *H04L 9/085* (2013.01); *H04L 63/061* (2013.01); *H04L 63/0807* (2013.01)

(56) References Cited

U.S. PATENT DOCUMENTS

| | | | | |
|---|---|---|---|---|
| 9,742,565 | B2* | 8/2017 | Li | H04L 9/0825 |
| 10,033,708 | B2* | 7/2018 | Raykova | H04L 9/008 |
| 10,038,562 | B2* | 7/2018 | Gajek | H04L 9/008 |
| 2001/0013048 | A1* | 8/2001 | Imbert de Tremiolles | G06F 7/22 708/207 |
| 2005/0247779 | A1* | 11/2005 | Ohkubo | G06K 7/10346 235/383 |
| 2011/0154033 | A1* | 6/2011 | Nakagoe | H04L 63/168 713/168 |
| 2013/0042106 | A1* | 2/2013 | Persaud | G06F 21/606 713/165 |
| 2014/0298009 | A1* | 10/2014 | Hattori | H04L 9/3073 713/155 |
| 2014/0373177 | A1* | 12/2014 | Arning | G06F 21/6218 726/28 |
| 2015/0149427 | A1* | 5/2015 | Kerschbaum | G06F 16/951 707/706 |
| 2015/0281184 | A1* | 10/2015 | Cooley | H04L 67/1097 713/171 |
| 2016/0132692 | A1* | 5/2016 | Kerschbaum | G06F 21/6227 713/189 |
| 2016/0182467 | A1* | 6/2016 | Hang | H04L 63/0464 713/153 |
| 2016/0330018 | A1* | 11/2016 | Miyata | G06F 21/45 |

OTHER PUBLICATIONS

Michael Ben-Or, Shafi Goldwasser and Avi Wigderson, "Completeness Theorems for Non-Cryptographic Fault-Tolerant Distributed Computation (Extended Abstract)," Proceedings of the 20th Annual ACM Symposium on Theory of Computing, 1988.

Oded goldreich, Silvio Micali, Avi Wigderson, "How to Play any Mental game or a Completeness Theorem for Protocols with Honest Majority," STOC 1987, pp. 218-229, 1987.

Reza Curtmola, Juan A. Garay, Seny Kamara, Rafail Ostrovsky, "Searchable Symmetric Encryption: Improved Definitions and Efficient Constructions," Journal of Computer Security 19 (5): 895-934, 2011.

Adi Shamir, "How to Share a Secret," Commun. ACM 22 (11), pp. 612-613, 1979.

Koichi Ito et al., "Proposal of a searchable secret sharing scheme", Special Interest Group Technical Reports of Information Processing Society of Japan, Mar. 6, 2014, vol. 2014-CSEC-64, No. 13, pp. 1-6, in particular, Section 3.

Dai Ikarashi et al., "Efficient lightweight computable 3-party secure function evaluation and secure database processing using the computation", Symposium on Cryptography and Information Security (SCIS 2011), Jan. 25, 2011, pp. 1-8, in particular, Sections 5 and 6.

* cited by examiner

SERVER DEVICE, DATA SEARCH SYSTEM, SEARCH METHOD, AND RECORDING MEDIUM FOR EXTRACTING CONCEALED DATA

TECHNICAL FIELD

The present invention relates to a server device and the like for extracting data in a system in which data are concealed and entrust secret data to a server.

BACKGROUND ART

There is a service that allows a client (user) to entrust data to an external third party. In a database server used in such a service, data entrusted by a client are stored in a database on the server. In this case, in order to prevent leakage, theft, or the like of information in the database storing the data, from the server side, the data need to be concealed. Information leakage is likely to occur especially in processing of extracting data that satisfy a certain property (for example, data having an attribute that has a certain value), from the server. In order to prevent this, it is desirable not to provide authorization other than a valid client to access the database that stores the data. However, in some situations, an administrator of the server needs permission to access the database for the purpose of managing the data. To address this, a technique has been developed that allows a user to extract desired data in such a server or a system including such a server while keeping the data concealed.

One approach to extracting data from a server in the system as described above while keeping secret of data is a method that uses Searchable Encryption (SE). The method using SE is encryption that allows a text including a search word to be searched for while a plaintext being searched for and a keyword (search word) included in the plaintext are kept encrypted. An encrypted plaintext being searched for is referred to as a ciphertext. In the method using SE, a search token including a search word and a secret key used for encryption is generated when a database is queried. Further, an encryption key included in the generated search token is used to decrypt the ciphertext to check whether the search word is present in a plaintext resulting from the decryption. The processing of the SE method is fast. However, in the SE method, a terminal of a client needs to hold (store) and manage a secret key in order to generate a search token used by the client to query the system.

On the other hand, there is a technique called secret computation using secret sharing scheme, as a method of extracting data without using a secret key. The secret sharing scheme will be described first. The secret sharing scheme is a method in which original secret information can be recovered by converting certain secret information (such as a secret key) to a plurality of pieces of distribution information and collecting a combination of pieces of distribution information that satisfies a certain condition. In this case, it is ensured that information about the original secret information does not leak out when a combination of pieces of distribution information that does not satisfy the certain condition is collected. A typical scheme of the secret sharing scheme is a method that uses Shamir's Secret Sharing (SSS) described in NPL 1. Shamir's Secret Sharing is secret sharing scheme that allows secret information to be recovered by collecting a certain number or more of pieces of distribution information.

Secret computation will be described next. The secret computation is a technique in which a value of any function that takes input of secret information can be calculated by cooperative computation by two or more server devices each of which holds secret information, without leaking respective pieces of secret information. Secret computation methods that use the secret sharing scheme include methods described in NPL 2 and NPL 3.

By distributively holding data being secret information among a plurality of server devises using secret sharing scheme (hereinafter referred to as secret sharing), entrusted data can be concealed from a system administrator being a third party and consequently the entrusted data can be protected from theft. The secret sharing scheme has an advantage that data can be extracted by using secret computation to calculate a function for determining whether or not a specified condition is satisfied, and a client terminal that performs a query does not need to hold a key in the data extraction. However, on the other hand, the secret sharing scheme has a problem that calculation processing of the secret computation takes time.

As a method of extracting data by using SE without using a secret key, a method to calculate a search token in SE by using a secret computation technique may be considered. In this method, a secret key of SE is secret-shared and held by each server along with secret information in a database. To request a search, an inquirer first sends secret-shared data of a search condition that is secret-shared, to each of the servers. Each server uses the secret-shared data of the search condition and secret-shared data of the secret key of SE to perform secret computation, thereby generating a search token.

In this method, data can be extracted without need for the inquirer to have a secret key. However, to decrypt the extracted data, each server needs to use the secret-shared data of the secret key to perform secret computation, and therefore there is also a problem of taking time to obtain a result of data extraction.

CITATION LIST

Non Patent Literature

[NPL 1] Adi Shamir, "How to Share a Secret," Commun. ACM 22 (11), pp. 612-613, 1979.

[NPL 2] Michael Ben-Or, Shafi Goldwasser and Avi Wigderson, "Completeness Theorems for Non-Cryptographic Fault-Tolerant Distributed Computation (Extended Abstract)," Proceedings of the 20th Annual ACM Symposium on Theory of Computing, 1988.

[NPL 3] Oded goldreich, Silvio Micali, Avi Wigderson, "How to Play any Mental game or A Completeness Theorem for Protocols with Honest Majority," STOC 1987, pp. 218-229, 1987.

[NPL 4] Reza Curtmola, Juan A. Garay, Seny Kamara, Rafail Ostrovsky, "Searchable Symmetric Encryption: Improved Definitions and Efficient Constructions," Journal of Computer Security 19 (5): 895-934, 2011.

SUMMARY OF INVENTION

Technical Problem

As described above, in aforementioned NPLs 1 to 3, there are the following problems. Techniques that search for concealed data include a method that uses secret computation and a method that uses SE. The method that uses secret computation has a problem of slow processing speed, whereas the method that uses SE has a problem that a client needs to have a secret key. A method that performs data search processing of SE by using secret computation also has a problem of slow processing speed because the method also requires secret computation for decrypting a search result.

In light of the problems described above, an object of the present invention is to provide a server device and the like that are capable of quickly extracting data without need for a client that performs a query of search processing to have a secret key.

Solution to Problems

In the view of the above problems, an aspect of the present invention is a server device comprising:

data storage means for storing concealed registration data including distribution information of registration data distributed by secret sharing scheme and a ciphertext of the registration data encrypted by searchable encryption;

token calculation means for generating a token for data search of the searchable encryption by communicating with an external server device and performing secret computation by using a search query and the distribution information; and data search means for performing data search from the token for data search received from the token calculation means and the concealed registration data acquired from the data storage means, and outputting a search result.

Other aspect of the present invention is a data search system comprising a plurality of the server devices and a proxy device that are connected through a network, wherein the proxy device includes:

registration data generation means for generating the concealed registration data to be stored in the plurality of server devices;

query data generation means for converting an analysis processing request input from outside to concealed query data to be sent to the plurality of server devices; and secret sharing decryption means for recovering a processing result from concealed search results received from the plurality of server devices.

Other aspect of the present invention is a search method comprising:

generating a token for data search of searchable encryption by performing secret computation by using a search query acquired from an external server and distribution information of registration data distributed by secret sharing scheme and acquired from data storage means for storing concealed registration data that include the distribution information and a ciphertext of the registration data encrypted by searchable encryption; and performing data search from the generated token for data search and the concealed registration data acquired from the data storage means and outputting a search result.

Other aspect of the present invention is a search program that causes a computer to implement the functions of:

generating a token for data search of searchable encryption by performing secret computation by using a search query acquired from an external server and distribution information of registration data distributed by secret sharing scheme and acquired from data storage means for storing concealed registration data that include the distribution information and a ciphertext of the registration data encrypted by searchable encryption; and performing data search from the generated token for data search and the concealed registration data acquired from the data storage means and outputting a search result. The search program can be stored in a recording medium.

Advantageous Effects of Invention

According to the present invention, data can be quickly extracted without need for a client that performs a query of search processing to have a secret key.

Further advantages and example embodiments of the present invention will be explained below in detail by using descriptions and drawings.

DESCRIPTION OF EMBODIMENTS

Example embodiments of the present invention will be described below with reference to the drawings. However, the technical scope of the present invention should not be construed as being limited by the example embodiments described below. The directions of arrows in FIGS. 1 to 6 are illustrative and are not intended to limit the directions of signals between blocks.

(First Example Embodiment)

A first example embodiment of the present invention will be described first.

Figure 1:
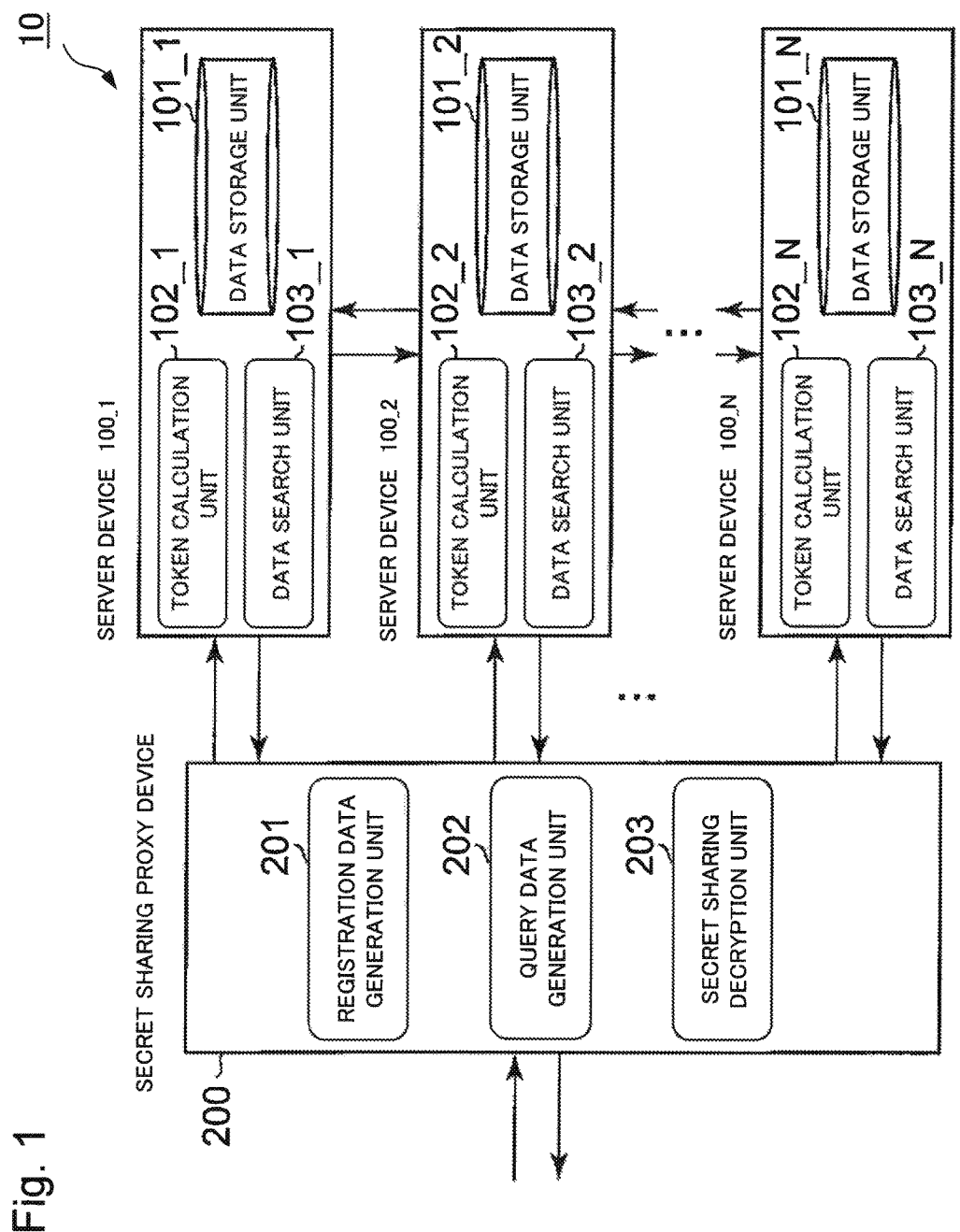
FIG. 1 is a block diagram illustrating an example functional configuration of a data search system according to a first example embodiment of the present invention.

FIG. 1 is a block diagram illustrating an example functional configuration of a data search system 10 according to the first example embodiment.

The data search system 10 includes a plurality of server devices 100_n ($1 \leq n \leq N$, where N is an integer greater than or equal to 2) and a secret sharing proxy device 200. The server devices 100_n and the secret sharing proxy device 200 will be described below in detail with reference to drawings.

(Server Device)

Figure 2:
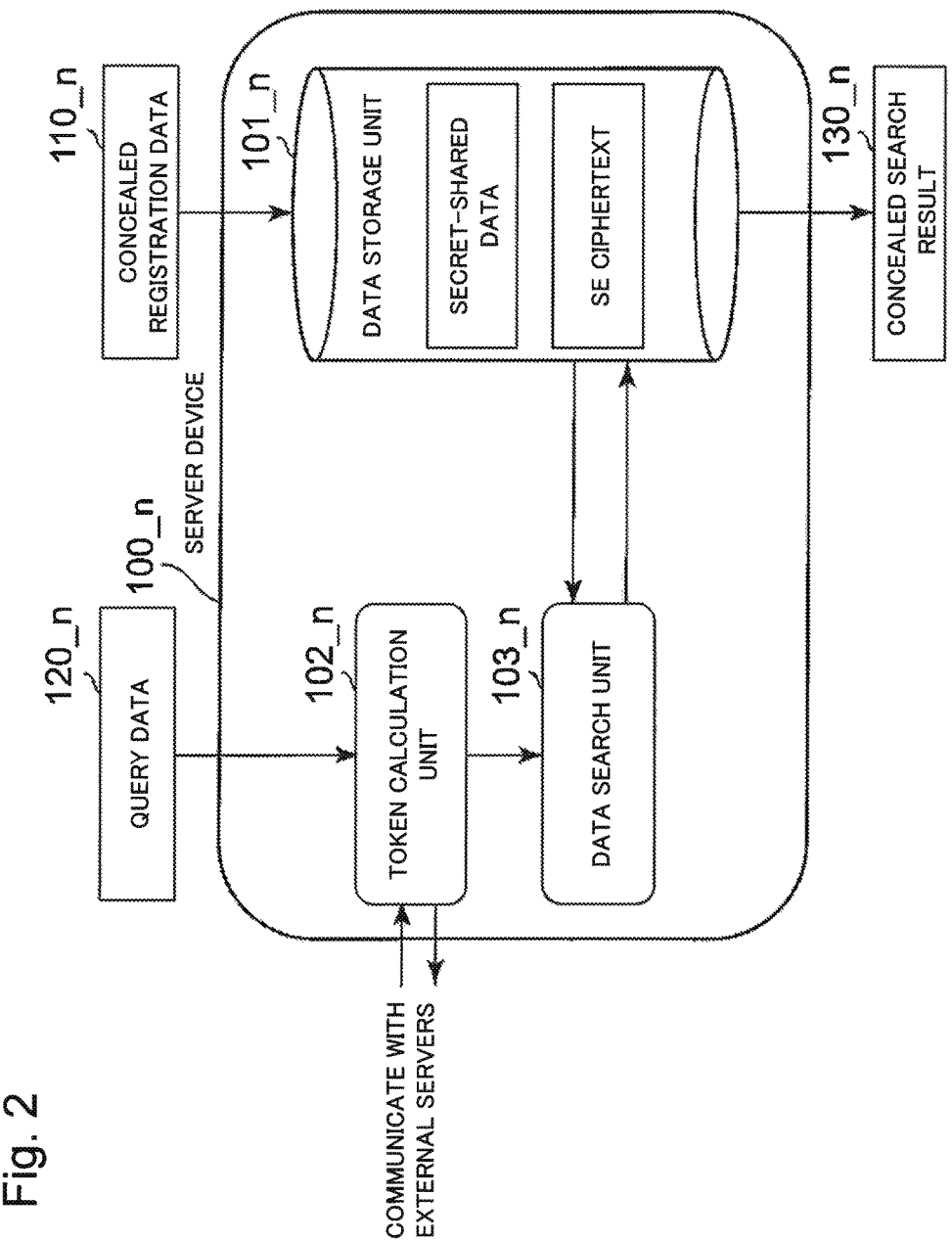
FIG. 2 is a block diagram illustrating an example functional configuration of a server device according to the first example embodiment of the present invention.

FIG. 2 is a block diagram illustrating in detail an example functional configuration of a server device 100_n illustrated in FIG. 1. The server device 100_n includes a data storage unit 101_n, a token calculation unit 102_n, and a data search unit 103_n.

The data storage unit 101_n stores secret-shared data and an SE ciphertext. The secret-shared data are distribution information of registration data that are secret-shared. The SE ciphertext is registration data (ciphertext) encrypted using SE, which will be described later. Further, the data storage unit 101_n receives and stores data extracted by the data search unit 103_n.

The token calculation unit 102_n generates a search token for data search while communicating with external, other server devices (for example, server devices 100_1 to 100_(n−1), 100_(n+1) to 100_N), by using query data (a search query) 120_n input from the secret sharing proxy device 200.

The data search unit 103_n searches through data stored in the data storage unit 101_n for data that match the search token received from the token calculation unit 102_n and returns a result of the search to the data storage unit 101_n.

(Secret Sharing Proxy Device)

Figure 3:
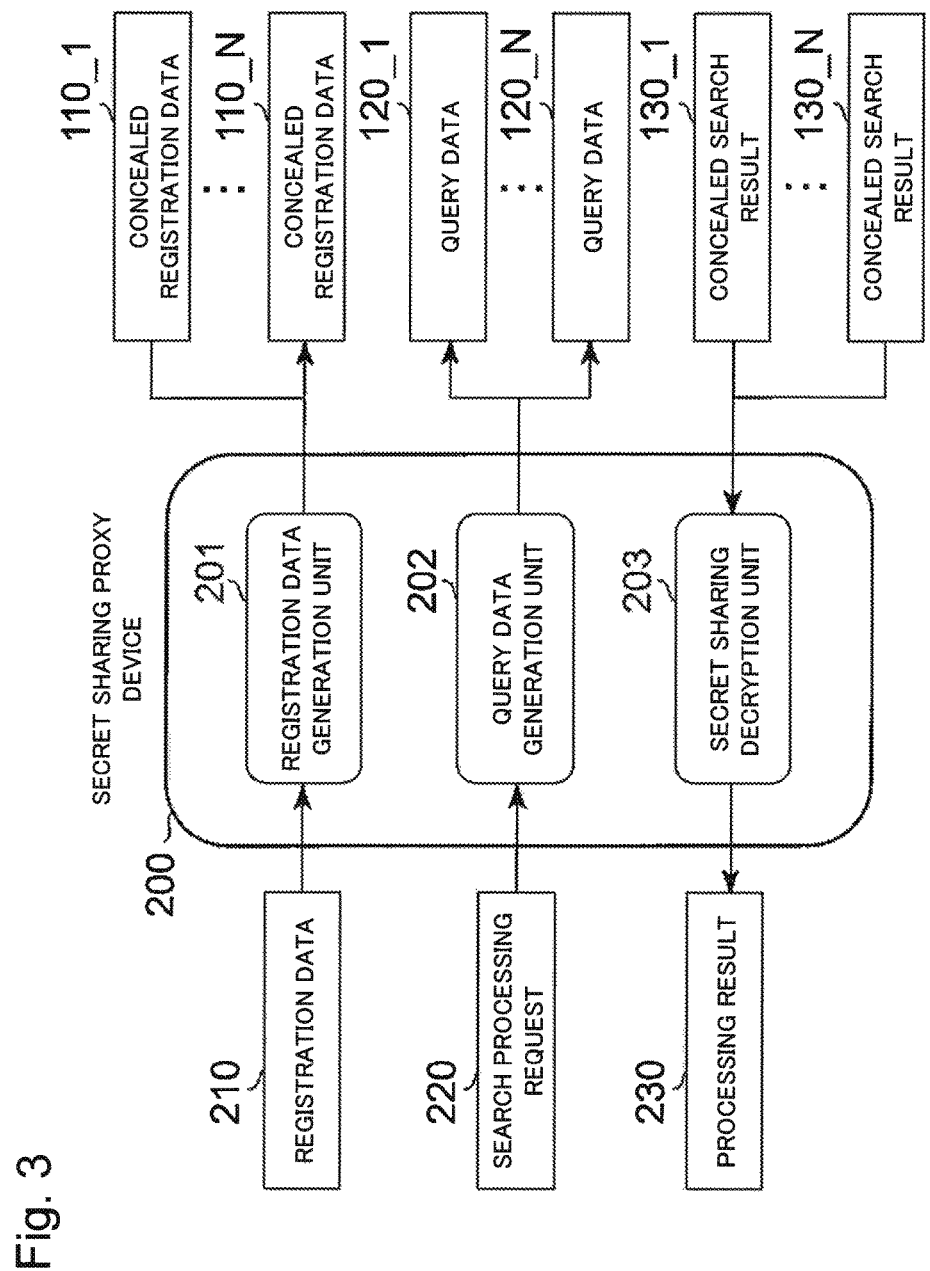
FIG. 3 is a diagram illustrating an example functional configuration of a secret sharing proxy device in FIG. 1.

FIG. 3 illustrates in detail an example internal configuration of the secret sharing proxy device 200 illustrated in FIG. 1. The secret sharing proxy device 200 includes a registration data generation unit 201, a query data generation unit 202, and a secret sharing decryption unit 203.

When the registration data generation unit 201 receives registration data 210 which are data to be stored and is input from an external client device (not depicted) or the like, the registration data generation unit 201 secret-shares the registration data 210 to generate a plurality of pieces of concealed registration data 110_1 to 110_N. Each of the pieces of concealed registration data 110_1 to 110_N includes distribution information of registration data that are secret-shared and registration data (a ciphertext) encrypted using SE.

When the query data generation unit 202 receives a search processing request 220 accepted from an external client terminal or the like, the query data generation unit 202 generates a plurality of pieces of query data 120_1 to 120_N from the search processing request 220. The query data generation unit 202 sends the generated pieces of query data 120_1 to 120_N to the server devices 100_1 to 100_N.

When the secret sharing decryption unit 203 receives concealed search results 130_1 to 130_N from the server devices 100_1 to 100_N, the secret sharing decryption unit 203 generates a processing result 230 (a search result) from the plurality of received concealed search results 130_1 to 130_N and outputs the processing result 230 to the external client terminal or the like.

Operations of the data search system 10 according to the first example embodiment of the present invention will be described in detail next. The data search system 10 according to the present example embodiment mainly performs two types of processing: (1) processing when registering data and (2) processing when searching for data. These operations will be described below with reference to flowcharts illustrated in FIGS. 7 and 8.

Figure 7:
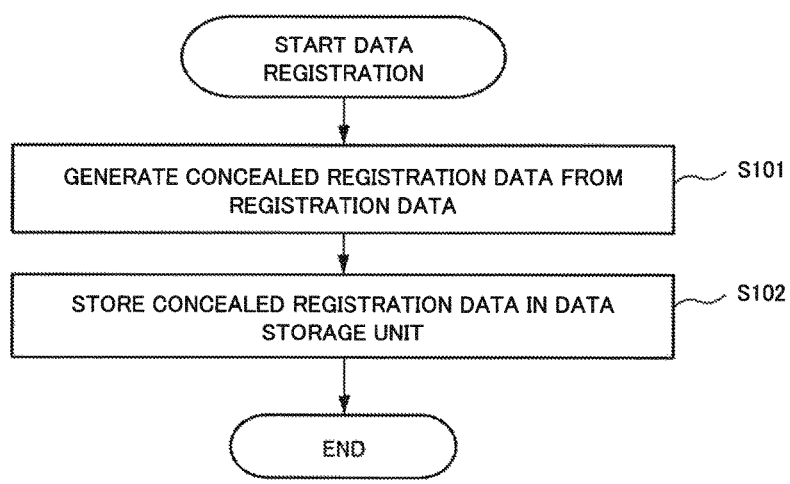
FIG. 7 is a flowchart illustrating an example of a data registration operation of the data search system according to the first example embodiment of the present invention.

First, processing of the data search system 10 when registering data will be described with reference to FIG. 7.

At step S101, the secret sharing proxy device 200 inputs registration data 210 which are data to be registered and are data input from an external client terminal or the like into the registration data generation unit 201. The registration data generation unit 201 secret-shares the registration data 210 to generate a plurality of pieces of concealed registration data 110_1 to 110_N. Each of the pieces of concealed registration data 110_1 to 110_N includes distribution information of the registration data that are secret-shared and a ciphertext of the registration data encrypted using SE. The registration data generation unit 201 of the secret sharing proxy device 200 sends the plurality of concealed registration data 110_1 to 110_N to the server devices 100_1 to 100_N.

At step S102, each server device 100_n stores a piece of concealed registration data 110_n received from the secret sharing proxy device 200 in the data storage unit 101_n.

Figure 8:
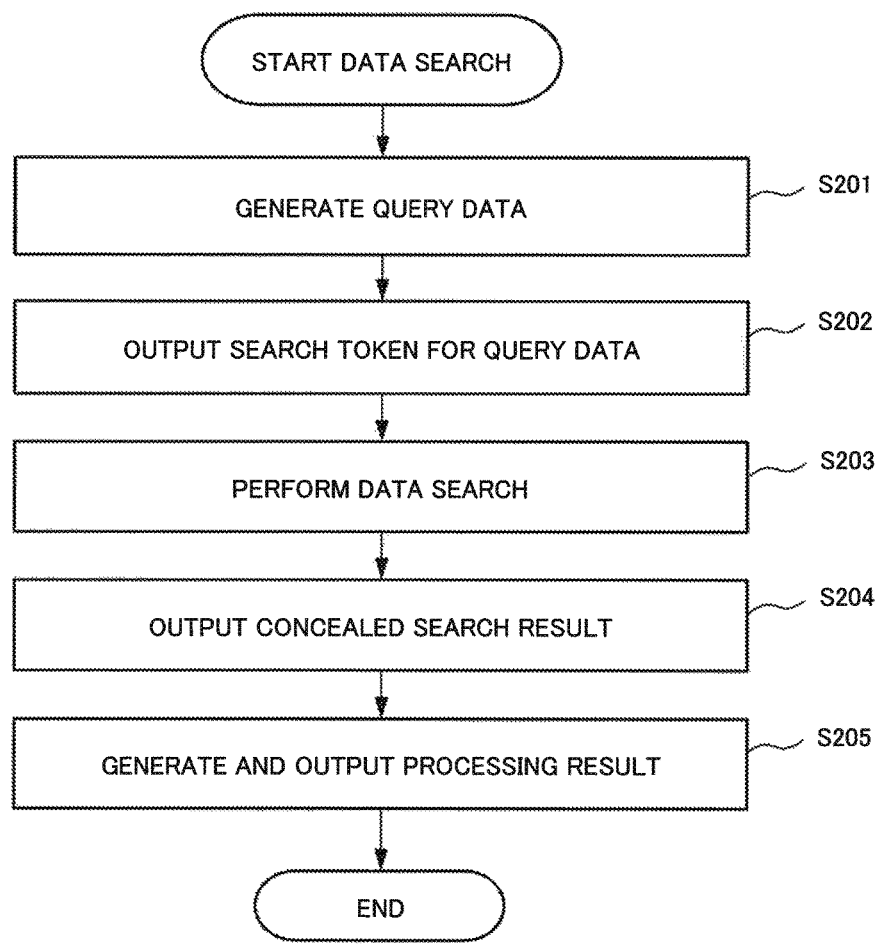
FIG. 8 is a flowchart illustrating an example of a data search operation of the data search system according to the first example embodiment of the present invention.

The processing performed by the data search system 10 when searching for data will be described next with reference to the flowchart in FIG. 8.

At step S201, the query data generation unit 202 of the secret sharing proxy device 200 generates a plurality of pieces of query data 120_1 to 120_N. Specifically, when the query data generation unit 202 receives a search processing request 220 from an external client terminal or the like, the query data generation unit 202 generates, on the basis of the search processing request 220, a plurality of pieces of query data 120_1 to 120_N for obtaining secret-shared registration data. The query data generation unit 202 sends the generated pieces of query data 120_1 to 120_N to the server devices 100_1 to 100_N.

At step S202, each server device 100_n performs secret computation on a piece of query data 120_n and outputs a search token. Specifically, the server device 100_n inputs the piece of query data 120_n received from the secret sharing proxy device 200 into the token calculation unit 102_n. The token calculation unit 102_n performs secret computation by using a method such as the method in NPL 2 or the method in NPL 3 while communicating with the other server devices and outputs an n-th search token by a method using SE. The server device 100_n inputs the n-th search token output from the token calculation unit 102_n and the concealed registration data 110_n stored in the data storage unit 101_n into the data search unit 103_n.

At step S203, the data search unit 103_n performs data search of SE on the basis of the input n-th search token and a ciphertext of SE included in the n-th piece of concealed registration data by using a method such as the method in NPL 4 to search for a ciphertext relating to the input search token and outputs a result of the search.

Note that the data search unit 103_n performs the secret computation described in step S202 above in gate processing (processing in which a function for determining whether or not a given property is satisfied is executed) as well. In doing this, the data search unit 103_n may perform secret sharing in the gate processing for a plurality of pieces of query data 120_1 to 120_N at a time. This enables the data search unit 103_n to quickly extract data by making use of SE, which is a fast search means. Further, the data search unit 103_n can perform the gate processing for bits of data in parallel by using a method called bit slicing, thereby can perform search processing for a plurality of pieces of data to in parallel by gate-by-gate processing. The data search unit 103_n decrypts retrieved data by recovering secret-shared data. Further, since the retrieved data are distributed by using secret sharing scheme, the data search unit 130 does not need to perform secret computation in decryption processing. Accordingly, the decryption is fast. Moreover, decryption of a computational result does not require a key. Specifically, since the secret computation technique is used to generate a search token for a keyword (a search word) in the present example embodiment, the search token can be generated without the need for a client terminal to have a key. This enables data extraction processing, which has been heavy load processing in secret computation, to be performed quickly by a method that uses SE.

At step S204, the server device 100_n outputs an n-th piece of secret-shared data relating to the result of the search by the data search unit 103_n among pieces of data stored in the data storage unit 101_n as a concealed search result 130_n. The server device 100_n sends the concealed search result 130_n to the secret sharing proxy device 200.

At step S205, when the secret sharing decryption unit 203 of the secret sharing proxy device 200 receives the concealed search result 130_n accepted from the server device 100_n, the secret sharing decryption unit 203 generates a processing result 230 from the concealed search result 130_n and outputs the processing result 230.

According to the first example embodiment of the present invention, data can be quickly extracted without the need for a client that performs a query of search processing to have a secret key.

More specifically, firstly, a client that performs a query of search processing can quickly extract data. In other words, the time required for search processing using secret computation can be reduced by performing the secret computation on data extracted by using SE. This is because the search processing by secret computation is performed without disclosing data entrusted to server devices to administrators of the server devices. Note that, in general, when search processing is performed using secret computation on all of data entrusted to server devices, the greater the amount of the data, the more time is required.

Secondly, the client that performs a query of search processing does not need to have a secret key. This has the advantageous effect of preventing information leakage of data to parties such as server administrators. This is because data are secret-shared and stored.

(Second Example Embodiment)

A second example embodiment of the present invention will be described next. The second example embodiment of the present invention is a variation of the first example embodiment described above. In the following description, elements in the present example embodiment that have the same functions as the elements already described in the description of the first example embodiment are given the same reference symbols and descriptions thereof will be omitted.

Figure 4:
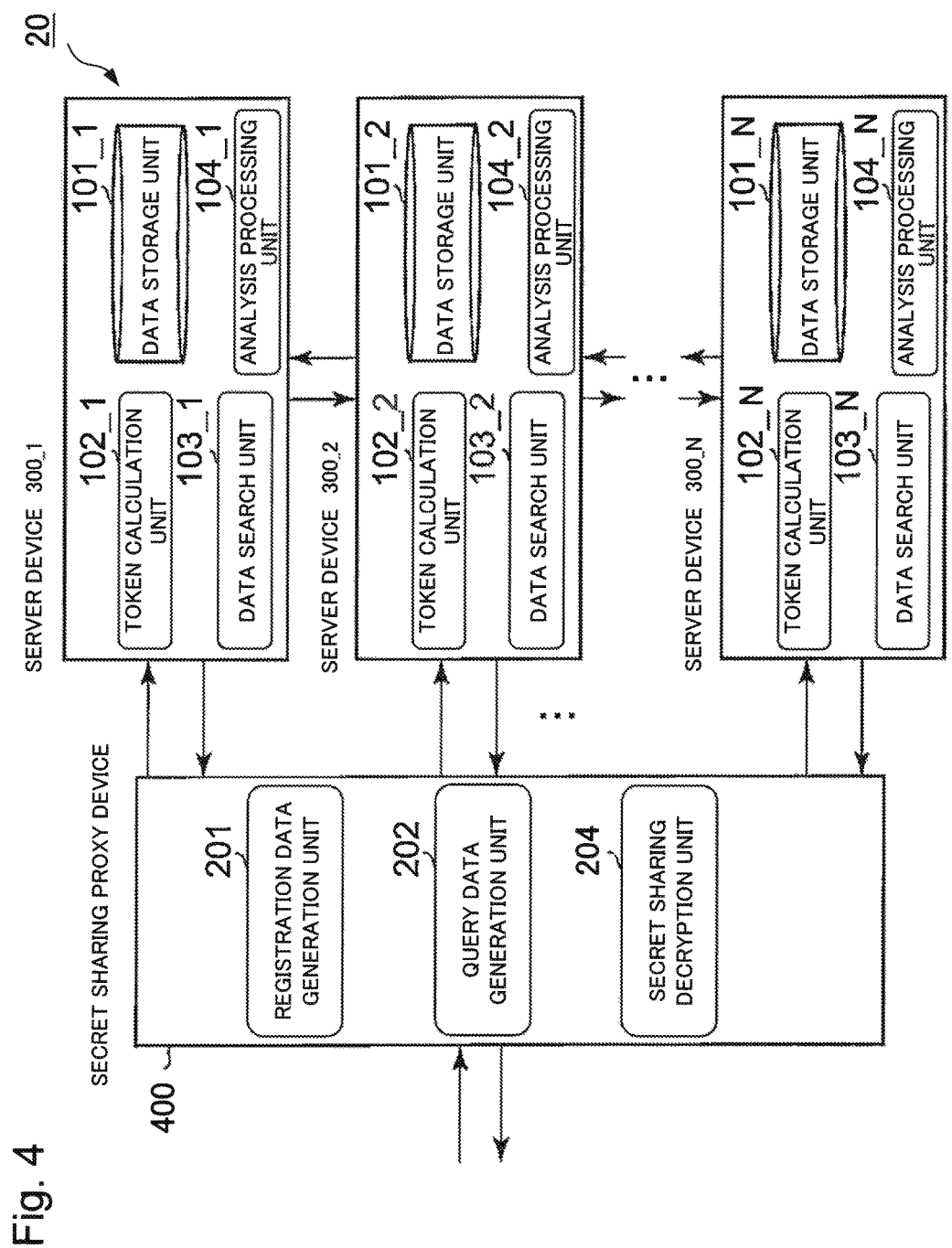
FIG. 4 is a block diagram illustrating an example functional configuration of a data search system according to a second example embodiment of the present invention.

FIG. 4 is a block diagram illustrating an example functional configuration of a data search system 20 according to the second example embodiment. The data search system 20 includes a plurality of server devices 300_1 to 300_N and a secret sharing proxy device 400.

Figure 5:
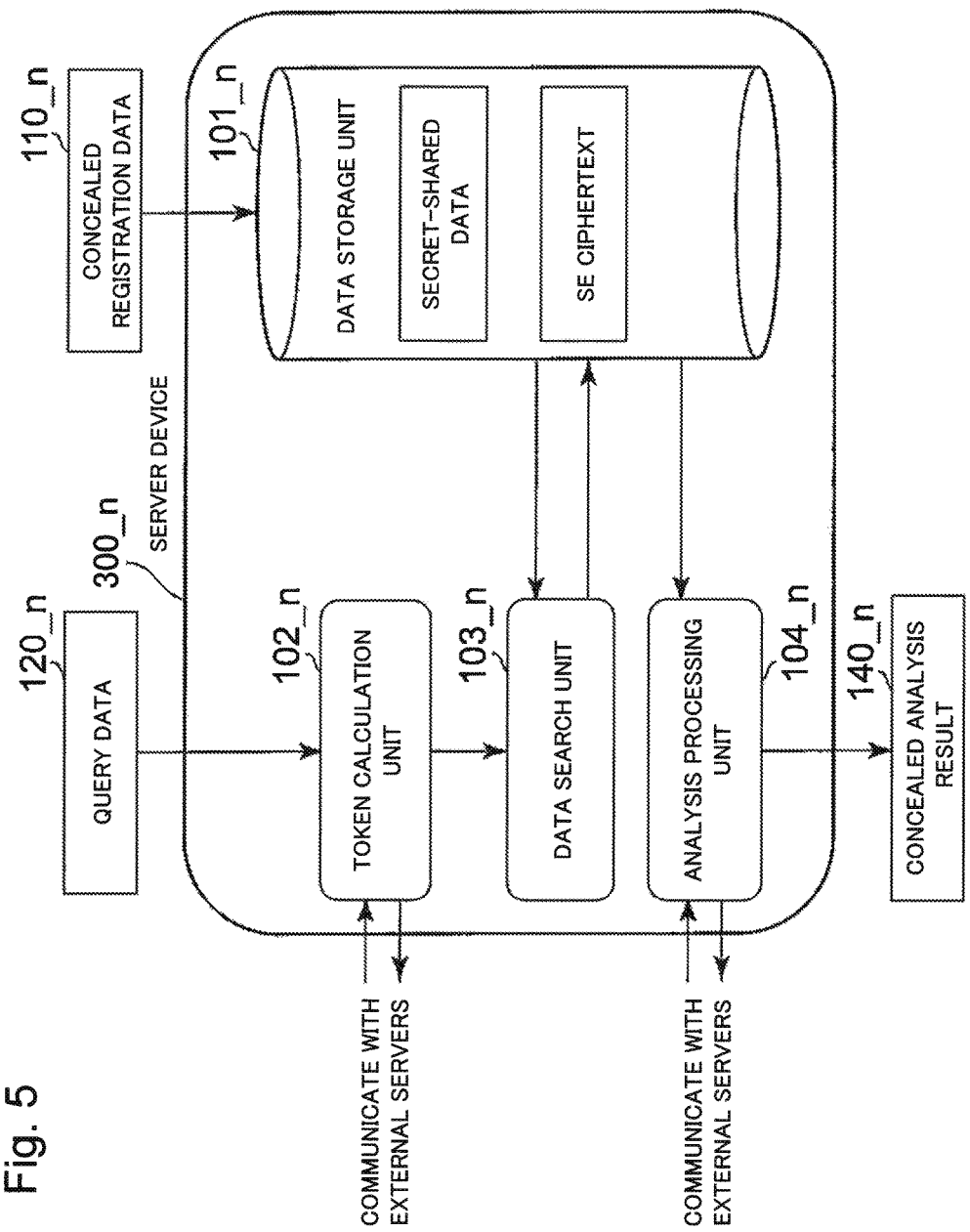
FIG. 5 is a block diagram illustrating an example functional configuration of a server device according to the second example embodiment of the present invention.

FIG. 5 is a block diagram illustrating an example functional configuration of each server device 300_n according to the second example embodiment. The server device 300_n includes a data storage unit 101_n, a token calculation unit 102_n, a data search unit 103_n, and an analysis processing unit 104_n.

The data storage unit 101_n stores concealed registration data 110_n received as an input from an external source.

The token calculation unit 102_n generates a search token for searching an n-th piece of data while communicating with external server devices by using query data 120_n received as an input from an external source.

The data search unit 103_n searches for data required for requested processing from the n-th search token received from the token calculation unit 102_n and data stored in the data storage unit 101_n and returns a search result to the n-th data storage unit 101_n.

The analysis processing unit 104_n performs, on data extracted by the data search unit 103_n, predetermined analysis processing according to a request from a client terminal by using a search result while communicating with external server devices, and outputs a concealed analysis result 140_n.

Figure 6:
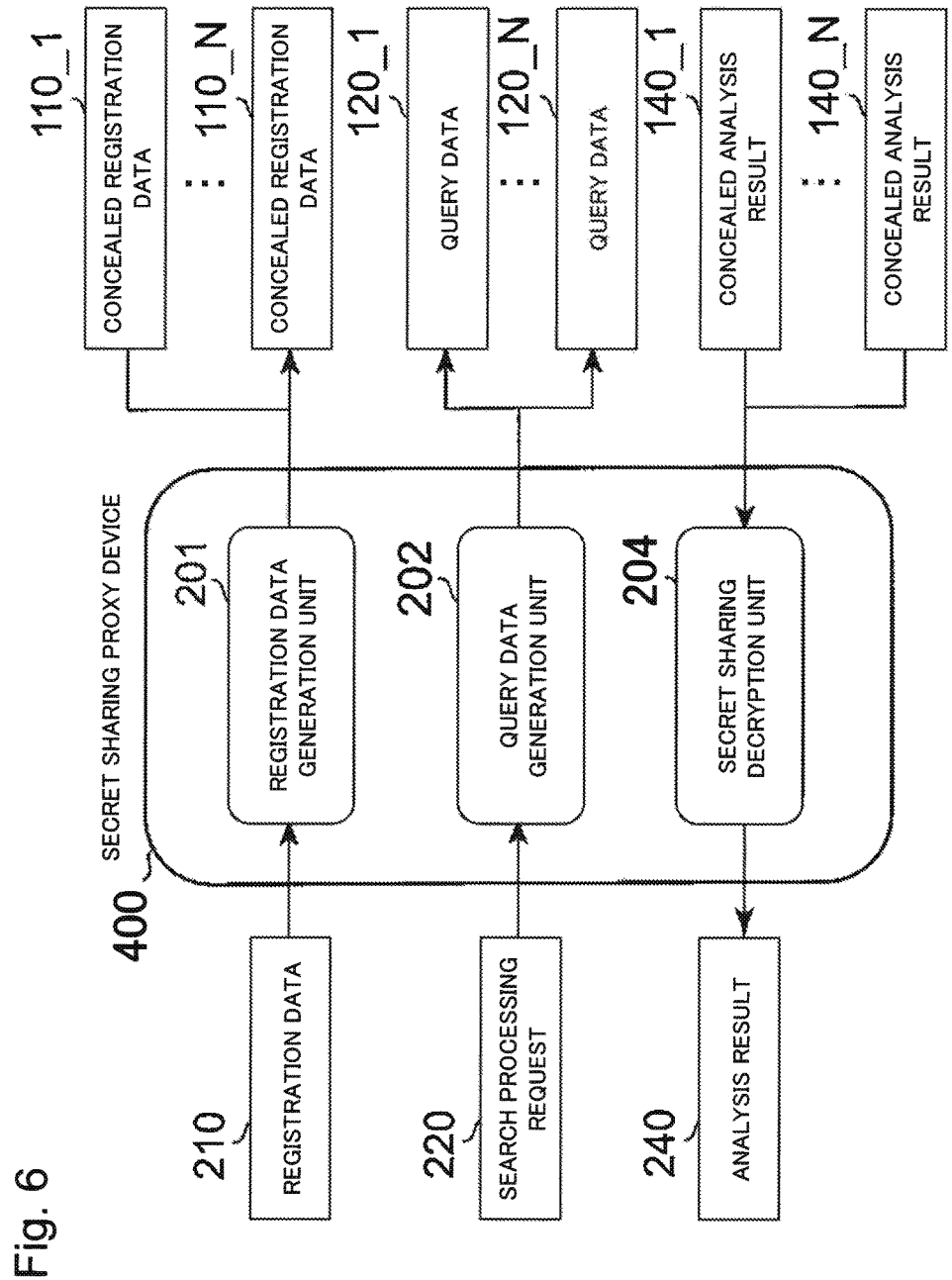
FIG. 6 is a diagram illustrating an example functional configuration of a secret sharing proxy device in FIG. 4.

FIG. 6 is a block diagram illustrating an example functional configuration of the secret sharing proxy device 400 according to the second example embodiment. The secret sharing proxy device 400 includes a registration data generation unit 201, a query data generation unit 202, and a secret sharing decryption unit 204, which will be described later.

When the secret sharing decryption unit 204 receives a plurality of concealed analysis results 140_1 to 140_N accepted from the server devices 300_1 to 300_N, the secret sharing decryption unit 204 generates an analysis result 240 from the plurality of concealed analysis results 140_1 to 140_N and outputs the analysis result 240.

The rest is the same as that of the first example embodiment.

Figure 9:
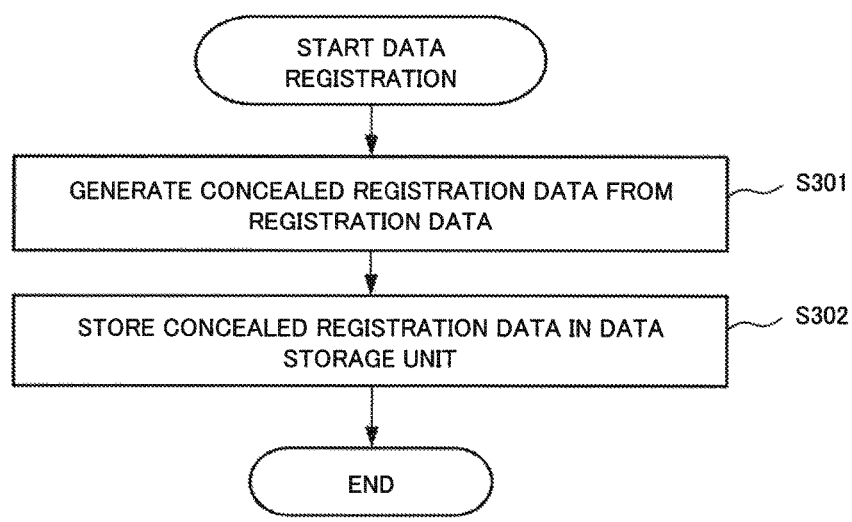
FIG. 9 is a flowchart illustrating an example of a data registration operation of the data search system according to the second example embodiment of the present invention.
Figure 10:
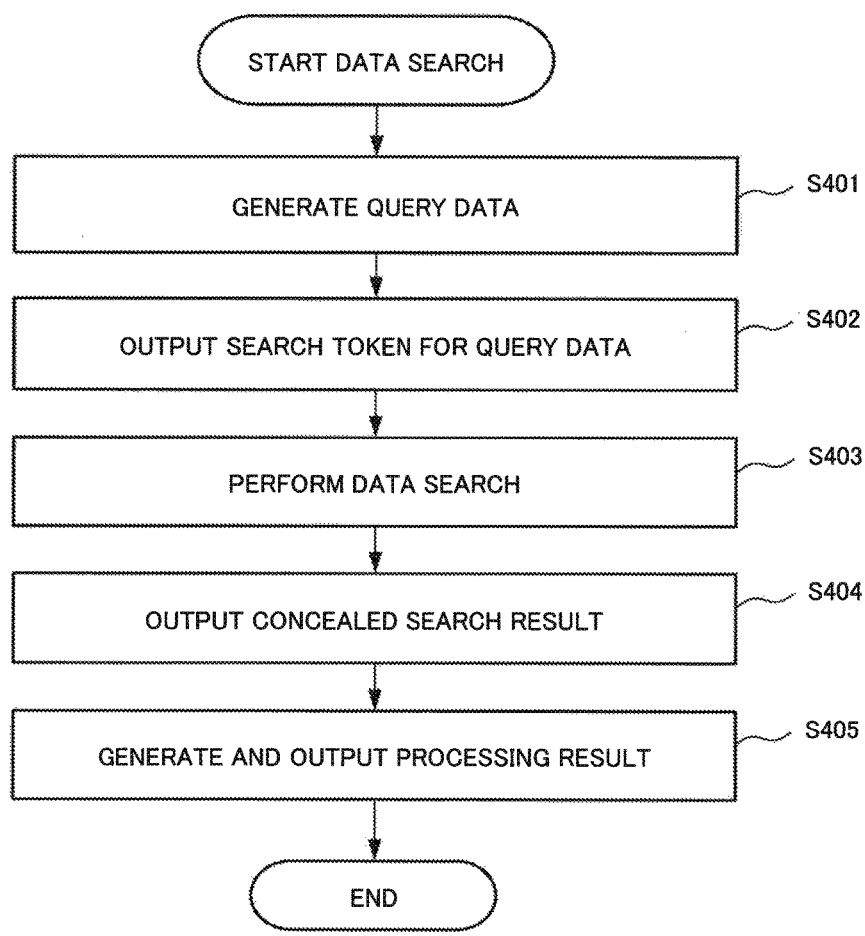
FIG. 10 is a flowchart illustrating an example of a data search operation of the data search system according to the second example embodiment of the present invention.

An operation of the data search system 20 according to the second example embodiment of the present invention will be described next in detail with reference to flowcharts in FIGS. 9 and 10. The concealed data search system 20 in the present example embodiment performs two types of processing: (1) processing when registering data and (2) processing when analyzing data.

The processing when registering data will be described first with reference to FIG. 9.

At step S301, the secret sharing proxy device 400 inputs registration data 210 input from an external source into the registration data generation unit 201. The registration data generation unit 201 generates a plurality of pieces of concealed registration data 110_1 to 110_N from the registration data 210. The registration data generation unit 201 of the secret sharing proxy device 400 sends the pieces of concealed registration data 110_1 to 110_N to the server devices 300_1 to 300_N.

At step S302, each server device 300_n stores a piece of concealed registration data 110_n received from the secret sharing proxy device 400 in the data storage unit 101_n.

The processing when analyzing data will be described next with reference to FIG. 10.

At step S401, the query data generation unit 202 of the secret sharing proxy device 400 receives a search processing request 220 accepted from an external source and generates a plurality of pieces of query data 120_1 to 120_N on the basis of the received search processing request 220. The query data generation unit 202 of the secret sharing proxy device 400 sends the pieces of query data 120_1 to 120_N to the server devices 300_1 to 300_N.

At step S402, the token calculation unit 102_n of the server device 300_n receives a piece of query data 120_n accepted from the secret sharing proxy device 400_n. The token calculation unit 102_n performs secret computation by using a method such as the method in NPL 2 or the method in NPL 3 while communicating with the other server devices and outputs an n-th search token of SE.

At step S403, the server device 300_n inputs the n-th search token output from the token calculation unit 102_n and the piece of concealed registration data 110_n stored in the data storage unit 101_n into the data search unit 103_n. On the basis of the input n-th search token and the input n-th piece of concealed registration data 110_n, the n-th data search unit 103_n performs data search by using a method such as the method in NPL 4 and outputs a search result. During this secret computation, the n-th data search unit 103_n performs secret computation of each round of gate processing that constitutes a function for determining whether or not a given property is satisfied. During this, the same gate of this function may be secret-shared for a plurality of rows at the same time.

At step S404, the server device 300_n outputs an n-th piece of secret-shared data relating to the result of the search by the data search unit 103_n among pieces of data stored in the data storage unit 101_n to the analysis processing unit 104_n ($1 \leq n \leq N$). The analysis processing unit 104_n performs predetermined analysis processing on the retrieved data by using secret computation while communicating with the other server devices and outputs a concealed analysis result 140_n.

At step S405, the analysis processing unit 104_n of the server device 300_n sends the concealed analysis result 140_n to the secret sharing proxy device 400. The secret sharing proxy device 400 inputs the concealed analysis results 140_1 to 140_N received from the server devices 300_1 to 300_N into the secret sharing decryption unit 204. The secret sharing decryption unit 204 generates an analysis result 240 from the plurality of concealed analysis results 140_1 to 140_N and outputs the analysis result 240.

The second example embodiment of the present invention described above has a third advantageous effect described below in addition to the first and second advantageous effects described in the description of the first example embodiment.

The third advantageous effect is applicability to applications in which analysis processing is entrusted to a third party's server device on the basis of a search result while hiding information concerning the processing from the third party's server device using secret computation. This is because the analysis processing using secret computation can be performed on retrieved data and therefore the analysis processing is sped up without leaking information.

(Third Example Embodiment)

Figure 11:
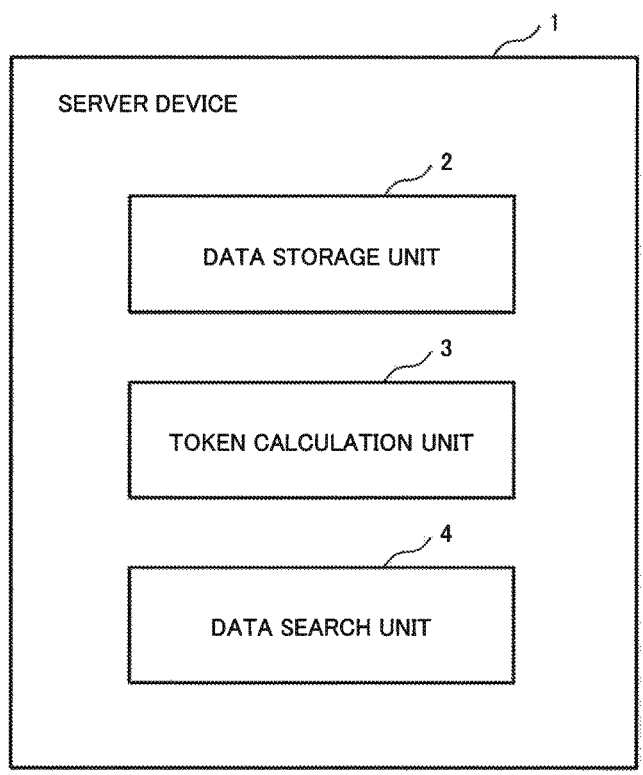
FIG. 11 is a block diagram illustrating an example configuration of a server device according to a third example embodiment of the present invention.

A server device 1 according to a third example embodiment of the present invention will be described with reference to FIG. 11. The third example embodiment of the present invention is an example minimum configuration for implementing the functions of the first and second example embodiments described above. The server device 1 is used in a system or the like in which data are concealed from and entrusted to the server device side. The server device 1 includes a data storage unit 2, a token calculation unit 3, and a data search unit 4.

The data storage unit 2 stores concealed registration data including distribution information of registration data distributed by secret sharing scheme and a ciphertext of the registration data encrypted using searchable encryption.

The token calculation unit 3 generates a data search token of searchable encryption by communicating with external server devices and performing secret computation using a search query and pieces of secret-shared distribution information.

The data search unit 4 performs data search by using a data search token received from the token calculation unit 3 and concealed registration data acquired from the data storage unit 2 and outputs a search result.

The server device 1 according to the present example embodiment is capable of quickly extracting data without the need for a client that performs a query of search processing to have a secret key. This is because the data storage unit 2 stores concealed registration data for secret sharing and the token calculation unit 3 performs analysis processing by secret computation without disclosing data entrusted to the server device 1 to an administrator of the server device 1.

Note that the search methods performed in the data search systems 10 and 20 and the server devices 100_n can be implemented by hardware, software or a combination of software and hardware. Implementing by a software means implementation by a computer reading and executing a program.

The program can be stored on any of various types of non-transitory computer readable media and can be provided to a computer. The non-transitory computer readable media include various types of tangible storage media. Examples of the non-transitory computer readable media include a magnetic recording medium (for example a flexible disk, a magnetic tape and a hard disk drive), a magneto-optical recording medium (for example a magneto-optical disk), a CD-ROM (Compact Disk-Read Only Memory), a CD-R (Read), a CD-R/W (Write), and a semiconductor memory (for example a mask ROM, a PROM (Programmable ROM), an EPROM (Erasable PROM), a flash ROM, and a RAM (Random Access Memory)). Further, the program may be provided to a computer by using any of various types of transitory computer readable media. Examples of the transitory computer readable media include electrical signals, optical signals, and electromagnetic waves. The transitory computer readable medium is capable of providing the program to a computer through a wired communication channel such as an electrical cable and an optical fiber or a wireless communication channel.

Figure 12:
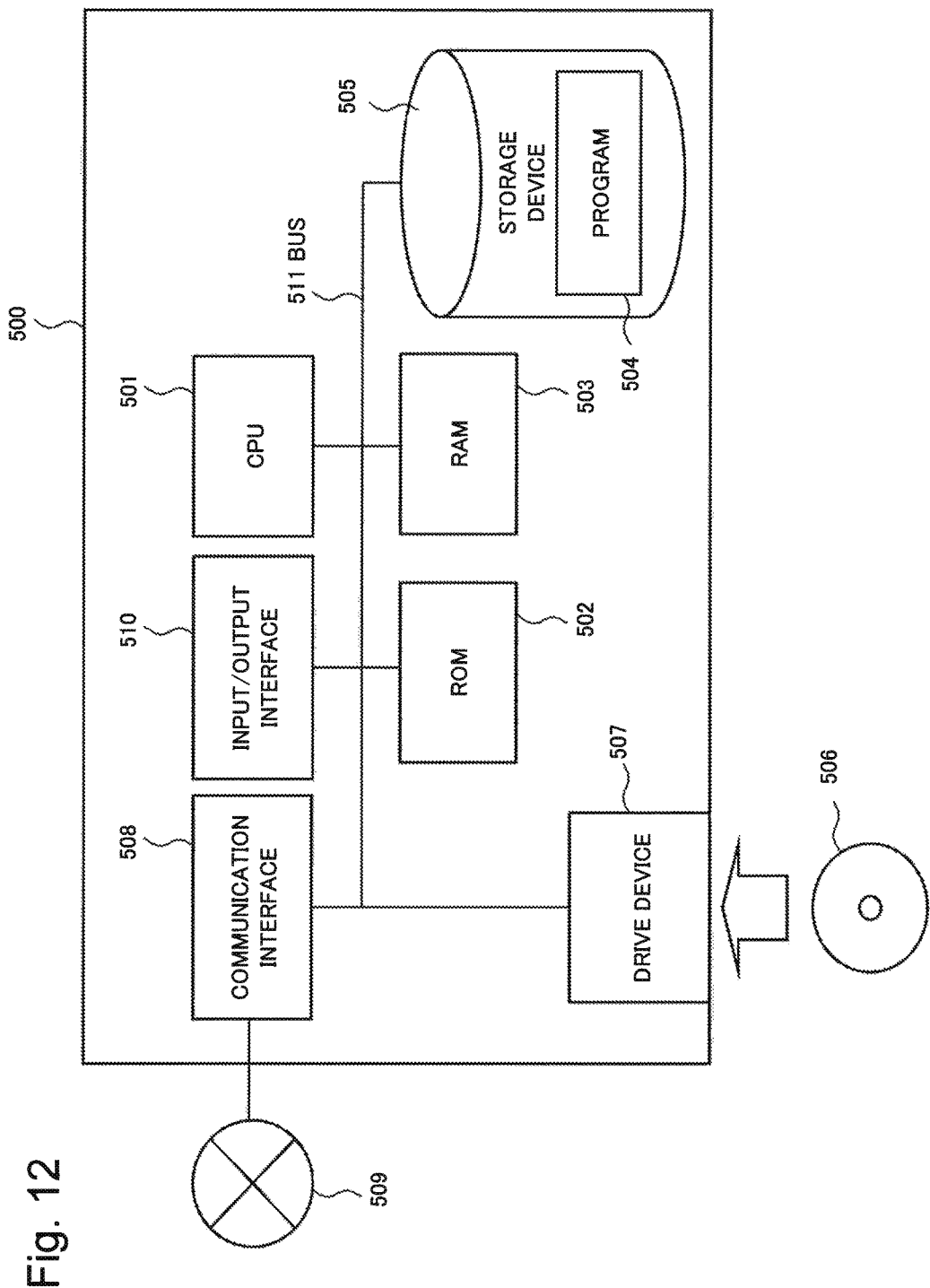
FIG. 12 is a block diagram illustrating an example of an information processing device that can be practically used in example embodiments.

In the example embodiments of the present invention, the components of the devices (systems) represent functional blocks. Some or all of the components of each device (system) may be implemented by any combination of an information processing device 500 as illustrated in FIG. 12, for example, and a program. The information processing device 500 includes the following configuration, for example.

CPU (Central Processing Unit) 501
ROM 502
RAM 503
Program 504 loaded into the RAM 503
Storage device 505 storing the program 504
Drive device 507 reading from and writing to a recording medium 506
Communication interface 508 connecting to a communication network 509
Input/output interface 510 inputting and outputting data
Bus 511 interconnecting the components The components of the devices in the example embodiments are implemented by the CPU 501 acquiring and executing the program 504 that implements the functions of the components. The program 504 that implements the functions of the components of the devices is stored on the storage device 505 or the RAM 503, for example, in advance and is read by the CPU 501 as needed. Note that the program 504 may be provided to the CPU 501 through the communication network 509 or may be stored on the recording medium 506 in advance and may be read out and provided by the drive device 507 to the CPU 501.

There are various variations of the method of implementing each device. For example, each of the components of each device may be implemented by any combination of a separate information processing device 500 and a program.

Further, a plurality of components of each device may be implemented by any combination of a single information processing device 500 and a program.

Further, some or all of the components of each device are implemented by other general-purpose or special-purpose circuit, processor or the like or a combination of them. They may be configured with a single chip or may be configured with a plurality of chips interconnected through a bus.

Some or all of the components of each device may be implemented by a combination of the circuits or the like mentioned above and a program.

If some or all of the components of each device are implemented by a plurality of information processing devices, circuits or the like, the plurality of information processing devices, circuits or the like may be centralized or distributed. For example, the information processing devices, circuits or the like may be implemented in a form such as a client-and-server system, a cloud computing system or the like in which the information processing devices, circuits or the like are interconnected through a communication network.

INDUSTRIAL APPLICABILITY

The present invention is applicable to applications in which a request is made to perform search processing for data concealed from and entrusted to a third party's server without disclosing the data.

While the present invention has been described with reference to example embodiments, the present invention is not limited to the example embodiments described above. Various modifications that can be understood by those skilled in the art can be made to the configurations and details of the present invention within the scope of the present invention.

This application is based upon and claims the benefit of priority from the Japanese Patent Application No. 2015-022891 filed on Feb. 9, 2015, the entire disclosure of which is incorporated herein.

REFERENCE SIGNS LIST

100_n Server device
101_n Data storage unit
102_n Token calculation unit
103_n Data search unit
104_n Analysis processing unit
110_n Hidden registration data
120_n Query data
130_n Hidden search result
140_n Hidden analysis result
200 Secret sharing proxy device
201 Registration data generation unit
202 Query data generation unit
203 Secret sharing decryption unit
210 Registration data
220 Search processing request
230 Processing result
240 Analysis result

The invention claimed is:

1. A server device comprising:
a data storage configured to store concealed registration data including distribution information of registration data distributed by secret sharing scheme and a ciphertext of the registration data encrypted by searchable encryption; and
one or more hardware processors configured to
generate a token for data search of the searchable encryption by communicating with an external server device and perform secret computation by using a search query and the distribution information, the secret computation being performed by parallelizing search processing on each row of the concealed registration data stored in the data storage by gate-by-gate processing, and
perform data search from the token for data search received from the one or more hardware processors and the concealed registration data acquired from the data storage, and output a concealed search result,
wherein the server device is configured to receive concealed query data converted from an analysis processing request input from outside, from the external server, and transmit a processing result from the concealed search results.

2. The server device according to claim 1, wherein the one or more hardware processors is, in response to a request, configured to perform analysis processing by using the secret computation, from the extracted search result.

3. A data search system comprising:
a plurality of the server devices; and
a proxy device connected to the plurality of server devices through a network,
wherein each of the plurality of server devices comprises
a data storage configured to store concealed registration data including distribution information of registration data distributed by secret sharing scheme and a ciphertext of the registration data encrypted by searchable encryption, and
one or more hardware processors configured to
generate a token for data search of the searchable encryption by communicating with the proxy device and perform secret computation by using a search query and the distribution information, the secret computation being performed by parallelizing search processing on each row of the concealed registration data stored in the data storage by gate-by-gate processing, and
perform data search from the token for data search received from the one or more processors and the concealed registration data acquired from the data storage, and output a concealed search result, and
wherein the proxy device includes:
one or more proxy device processors configured to
generate the concealed registration data to be registered in the plurality of server devices,
convert an analysis processing request input from outside to concealed query data to be sent to the plurality of server devices, and
recover a processing result from concealed search results received from the plurality of server devices.

4. A search method comprising:
generating, by one or more hardware processors, a token for data search of searchable encryption by performing secret computation by using a search query acquired from an external server and distribution information of registration data distributed by secret sharing scheme and acquired from data storage configured to store concealed registration data that include the distribution information and a ciphertext of the registration data encrypted by searchable encryption, the secret computation being performed by parallelizing search processing on each row of the concealed registration data stored in the data storage by gate-by-gate processing; and performing, by the one or more hardware processors, data search from the generated token for data search and the concealed registration data acquired from the data storage and outputting a search result, wherein the one or more hardware processors is configured to receive concealed query data converted from an analysis processing request input from outside, from the external server, and transmit a processing result from the concealed search results.

5. The search method according to claim 4, further comprising performing, in response to a request, analysis processing by using the secret computation, from the search result.

6. A non-transitory computer readable recording medium that stores a search program that causes a computer to implement the functions of:

generating a token for data search of searchable encryption by performing secret computation by using a search query acquired from an external server and distribution information of registration data distributed by secret sharing scheme and acquired from data storage configured to store concealed registration data that include the distribution information and a ciphertext of the registration data encrypted by searchable encryption, the secret computation being performed by parallelizing search processing on each row of the concealed registration data stored in the data storage by gate-by-gate processing; and performing data search from the generated token for data search and the concealed registration data acquired from the data storage and outputting a search result, wherein the computer is configured to implement the functions of receiving concealed query data converted from an analysis processing request input from outside, from the external server, and transmitting a processing result from the concealed search results.

7. The non-transitory recording medium according to claim 6, further comprising a function of performing, in response to a request, analysis processing by using the secret computation, from the search result.

\* \* \* \* \*